United States Patent [19]

Weber et al.

[11] Patent Number: 4,820,235
[45] Date of Patent: Apr. 11, 1989

[54] THREADED FASTENER

[75] Inventors: David Weber, Elk Grove Village; Stanley Marchewka, Chicago, both of Ill.

[73] Assignee: Hirsh Company, Skokie, Ill.

[21] Appl. No.: 78,875

[22] Filed: Jul. 28, 1987

[51] Int. Cl.$^4$ .......................................... F16B 39/282
[52] U.S. Cl. ................... 411/188; 411/399; 411/459
[58] Field of Search .................. 411/185–188, 411/399, 957, 959

[56] References Cited

U.S. PATENT DOCUMENTS

| | | |
|---|---|---|
| 205,990 | 7/1878 | Armstrong . |
| 388,000 | 8/1888 | Rider . |
| 586,232 | 7/1897 | English . |
| 1,238,636 | 8/1917 | Christofferson . |
| 1,749,903 | 3/1930 | Cannon . |
| 1,802,668 | 4/1931 | Newton . |
| 1,827,628 | 10/1931 | Twedell . |
| 1,864,211 | 6/1932 | Olson . |
| 1,875,930 | 9/1932 | Martin . |
| 1,952,305 | 3/1934 | Beck . |
| 1,953,305 | 4/1934 | MacLean . |
| 1,969,796 | 8/1934 | Hoke . |
| 2,024,070 | 12/1935 | Sharp . |
| 2,037,586 | 4/1936 | Olson . |
| 2,076,041 | 4/1937 | Payne . |
| 2,346,835 | 4/1944 | Green . |
| 2,778,399 | 1/1957 | Mroz . |
| 2,833,326 | 5/1958 | Knohl . |
| 3,002,544 | 10/1961 | Buechting . |
| 3,073,207 | 1/1963 | Lovisek . |
| 3,124,408 | 3/1964 | Oestereicher . |
| 3,177,755 | 4/1965 | Kahn . |
| 3,241,422 | 3/1966 | Heimovics . |
| 3,247,752 | 4/1966 | Greenleaf . |
| 3,255,797 | 6/1966 | Attwood . |
| 3,286,579 | 11/1966 | Lovisek . |
| 3,322,019 | 5/1967 | Lovisek . |
| 3,342,236 | 9/1967 | Clark . |
| 3,370,631 | 2/1968 | James . |
| 3,389,734 | 6/1968 | Gutshall . |
| 3,469,490 | 9/1969 | Pearce . |
| 3,605,845 | 9/1971 | Junker . |
| 3,640,326 | 2/1972 | Brown . |
| 3,661,046 | 5/1972 | Waud . |
| 3,782,436 | 1/1974 | Steiner . |
| 3,803,972 | 4/1974 | Deutsher . |
| 3,812,639 | 5/1974 | Sygnator . |
| 3,856,065 | 12/1974 | Gehring . |
| 3,913,649 | 10/1975 | Stanaitis . |
| 3,967,875 | 7/1976 | Stanaitis . |
| 3,982,575 | 9/1976 | Ollis . |
| 4,094,352 | 6/1978 | Hlinsky . |
| 4,103,725 | 8/1978 | Abe . |
| 4,220,188 | 9/1980 | McMurray . |
| 4,294,300 | 10/1981 | Bouwman . |
| 4,310,272 | 1/1982 | Rich . |
| 4,361,997 | 12/1982 | DeCaro . |
| 4,490,082 | 12/1984 | Barth .................. 411/185 |
| 4,516,893 | 5/1985 | Barth . |
| 4,518,294 | 5/1985 | Barth .............. 411/399 X |
| 4,657,459 | 4/1987 | Landt . |
| 4,705,441 | 11/1987 | Arnold ............ 411/399 X |
| 4,749,319 | 6/1988 | Sygnator . |
| 4,749,322 | 6/1988 | Sygnator . |
| 4,764,066 | 8/1988 | Terrell et al. ........... 411/187 |

OTHER PUBLICATIONS

"LGM" Advertisement of Southern Screw Co., (2 pages) plus LGM Technical Data, (5 pages), 1985.
Cyclone Tapping Screw Advertisement (4 pages).

Primary Examiner—Neill R. Wilson
Attorney, Agent, or Firm—Dressler, Goldsmith, Shore, Sutker & Milnamow, Ltd.

[57] ABSTRACT

An improved threaded fastener is provided with a shank, a head connected to the shank, and a thread form on the shank terminating below the head. A plurality of lugs are provided above at least a portion of the thread form and are circumferentially disposed under the fastener head around the shank seriatim from a first lug to a last lug. Each lug defines an exposed engaging margin extending from the fastener shank at an acute angle relative to the longitudinal axis of the fastener. The maximum radial dimension of each lug progressively increases from the first lug to the last lug while a corresponding maximum axial dimension of each lug progressively decreases whereby the acute angle becomes progressively greater.

16 Claims, 1 Drawing Sheet

THREADED FASTENER

TECHNICAL FIELD

This invention relates to screw fasteners, and particularly to screw fasteners for use with lighter (thinner) gauge sheet metal and the like materials.

BACKGROUND OF THE INVENTION AND TECHNICAL PROBLEMS PROPOSED BY THE PRIOR ART

It has been a recent trend in various industries to employe lighter gauge sheet metal or other thin materials in various constructions. This has typically resulted from a desire to reduce the weight and production cost.

Conventional screw fasteners, such as sheet metal screws, typically do not function as well with such thinner materials. With a conventional sheet metal screw, the thread may become substantially disengaged from the material when the head of the screw is drawn into engagement with the material. This results in the installed screw being rotatable or loose in the material—the so called "strip-out" condition.

It would be desirable to provide a threaded fastener having a greater resistance to strip-out when used on relatively thin sheet materials. Further, it would be desirable to provide an improved threaded fastener that would have a greater thread engagement and a greater clamping capability. Also, it would be desirable if the torque at which the improved threaded fastener encountered the strip-out condition would be significantly greater then the torque normally required to drive the threaded fastener through the sheet material and into clamping engagement with the material.

SUMMARY OF THE INVENTION

A threaded fastener is provided with a shank, a head connected to the shank, and a thread form on the shank terminating below the head. The fastener includes a plurality of lugs located above at least a portion of the thread form and circumferentially disposed under the fastener head around the shank seriatim from a first lug to a last lug.

Each lug defines an exposed engaging margin extending from the fastener shank at an acute angle relative to the longitudinal axis of the fastener. The maximum radial dimension of each lug progressively increases from the first lug to the last lug while the corresponding maximum axial dimension of each lug progressively decreases whereby the acute angle becomes progressively greater.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the fastener of this invention is described in an upright operating position with the fastener head oriented vertically above the fastener shank, and such terms as upper, lower, horizontal, etc., are used with reference to this orientation. It will be understood, however, that the fastener of this invention may be used in an orientation other than the orientation described.

Figure 1:
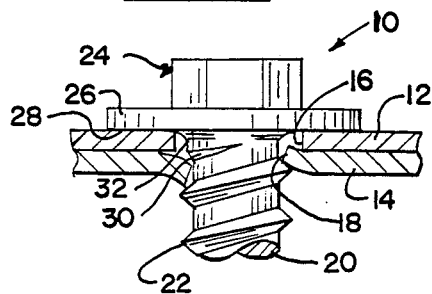
FIG. 1 is a fragmentary, partial cross-sectional view of a conventional threaded fastener shown in clamping engagement with two light gauge or thin of sheet material.
Figure 5:
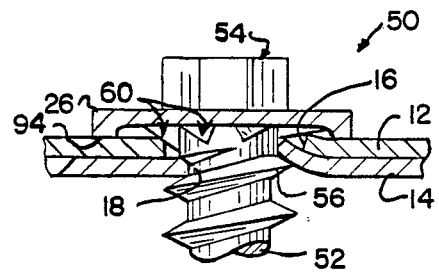
FIG. 5 is a view similar to FIG. 1, but showing the improved threaded fastener of the present invention engaged with the sheet material panels.

A conventional, prior art threaded fastener typically employed in various industries is designated generally by the reference numeral 10 in FIG. 1 and is shown engaged with two pieces or panels of thin sheet material, such as sheet metal. The upper panel of sheet material is designated by the reference numeral 12 and may be referred to as the bearing panel. The lower panel of sheet material is designated by the reference numeral 14 and may be referred to as the tapping panel. Typically, the upper (bearing) panel 12 defines an aperture 16 of a predetermined diameter, and the lower (tapping) panel 14 has an aperture 18 with a diameter less than the diameter of the bearing panel aperture 16.

The conventional screw 10 includes a shank 20 defining thereon a thread form or thread 22. The upper end of the shank 20 extends from, and is integral with, a head 24. The head 24 may include an annular rim or flange 26 defining an undersurface 28 for engaging the upper surface of the bearing panel 12.

Owing to the conventional process for manufacturing the conventional fastener 10, the radial extent of the thread 22 decreases as it approaches the flange 26 of the fastener head 24. That is, as can be seen in FIG. 1 for an end portion 30 of the thread 22, the crest height of the thread at the portion 30 is less than the crest height of the thread 22 measured at a point further down the shank. In addition, it to be noted that the root diameter of the shank at root region 32 is greater than the root diameter of the shank at locations further from the head 24.

With continued reference to FIG. 1, the conventional fastener 10 is typically installed in the sheet material panels 12 and 14 after the apertures 16 and 18 have been formed in the sheet materials. Typically, the diameter of the aperture 16 is great enough to accommodate without interference the insertion of the shank 20. However, the diameter of the aperture 18 of the lower sheet material panel is typically less than the maximum crest diameter (major diameter) of the thread 22. The thread 22 thus can threadingly engage the tapping panel 14 around the periphery of the aperture 18.

When the fastener 10 is driven sufficiently into engagement with the panels so that the flange 26 approaches and engages the upper or bearing panel 12, the reduced diameter portion at the upper end of the thread 22 becomes positioned adjacent to the lower, tapping panel 14 in the aperture 18. Since the diameter of the thread crest in this region of the thread is considerably reduced, there is frequently minimal engagement between the thread and the panel 14 as illustrated in FIG. 1. Typically, the thread 22 locally deforms the panel 14 somewhat (and to a greater extent with the lighter gauge sheet materials).

As a result of the deformation of the panel 14 and of the reduced thread engagement resulting from the reduced diameter thread portion 30, the fastener 10 may be so easily rotated that it is regarded as being in the "strip-out" condition. Even if the fastener 10 does not freely rotate in a "strip-out" condition, the fastener 10 will have reduced holding power and less resistance to vibration.

FIGS. 2-6 illustrate an improved threaded fastener 50 of the present invention. The fastener 50 has a shank 52 and a head 54 connected to the shank 52. The head 54 may have the shape of a polygon with a plurality of tool-engaging faces and/or may include a slot or other cavity (not illustrated) for being engaged by a driving tool.

Figure 2:
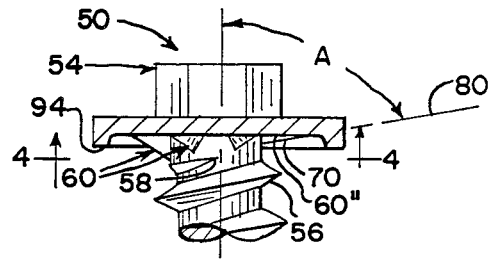
FIG. 2 is a fragmentary, partial cross-sectional view of an improved threaded fastener of the present invention.

The fastener 50 includes a thread or thread form 56 on the shank 52 terminating below the head 54. The thread form 56 terminates at a point 58 as best illustrated in FIG. 2. In the preferred embodiment, the shank 52 is substantially cylindrical over a major portion of its length, and the thread form 52 defines a single, helical, right-hand thread.

The fastener includes a plurality of lugs 60 which are located above at least a portion of the thread form 56 and which are circumferentially disposed under the fastener head 54 around the shank 52 seriatim from a first lug 60' to a last lug 60''. Although the figures illustrate a preferred embodiment in which the lugs 60 are equally spaced around the shank 52, the invention is not limited to the embodiment illustrated, and the scope of the invention is pointed out in the appended claims.

Each lug 60 defines an exposed engaging margin 70 (FIGS. 4 and 6) extending from the fastener shank 52 at an acute angle relative to the longitudinal axis of the fastener 50. The acute angle is measured, as illustrated in FIG. 2 for lug 60'', as the angle A between the longitudinal axis 78 as it extends beyond the fastener head 54 and the upwardly slanting line 80 extending from, and coincident with, the exposed engaging margin 70.

Figure 3:
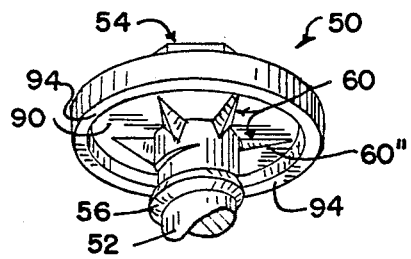
FIG. 3 is a fragmentary, perspective view of the threaded fastener of the present invention.
Figure 4:
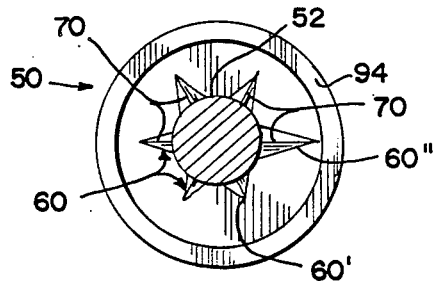
FIG. 4 is a cross-sectional view taken generally along the plane 4—4 in FIG. 2.

As best illustrated in FIG. 4, the maximum radial dimension of each lug 60 progressively increases from the first lug 60' to the last lug 60'' (when progressing in a clockwise direction as viewed in FIG. 4). As best illustrated in FIGS. 3 and 4, the radial dimensions of the lugs 60 increase seriatim around the shank 52 from the first lug 60' to the last lug 60'' in the circumferential direction identical to that direction in which the thread form 56 extends toward the fastener head 54. As the maximum radial dimensions of the lugs 60 progressively increase, the corresponding maximum axial dimension of each lug 60 progressively decreases (as best illustrated in FIGS. 2 and 3). Thus, the first lug 60' has the least (shortest) radial dimension but has the greatest axial dimension. Similarly, the last lug 60'' has the greatest (longest) radial dimension but has the least axial dimension.

Figure 6:
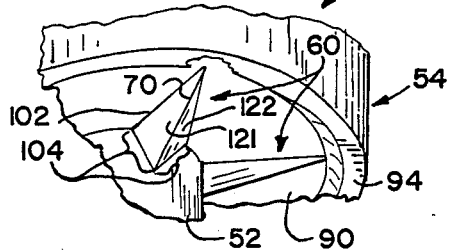
FIG 6 is a greatly enlarged, fragmentary, perspective view similar to FIG. 3 showing in greater detail the lug structure of the fastener of the present invention.

In the preferred embodiment illustrated, the improved fastener 50 of the present invention has a lower surface 90 on the fastener head 54 as best illustrated in FIG. 6. The lower surface 90 extends peripherally around the shank 52. The lower surface 90 is substantially planar and defines an annulus around the shank 52.

In the preferred embodiment, the fastener 50 also preferably includes an annular rim or flange 94 (as best illustrated in FIGS. 2-6). The annular rim depends from the periphery of the head 54 and defines a recess below the head lower surface 90. Thus, the lower surface 90 of the head 54 can be said to define the upper boundary of the recess.

In the preferred embodiment of the fastener 50 of the present invention as illustrated, the lugs 60 have a unique shape. With reference to FIG. 6, it is seen that each lug 60 has an upper margin 102 connected to the head lower surface 90 and has a side margin 104 connected to the fastener shank 52 above the thread form 56. The upper margin 102 may be considered to be defined at the horizontal triangular area of the lug 60 that is integrally connected and unitary with the head lower surface 90. The side margin 104 may be considered to be defined by the end of the lug 60 that is integrally connected and unitary with the shank 52.

Each lug exposed engaging margin 70 thus extends at the acute angle A relative to the longitudinal axis of the fastener 50 between the side margin 104 (at the fastener shank 52) and the upper margin 102 (at the fastener head lower surface 90).

The upper margins 102 of the lugs 60 progressively increase in radial dimension from the first lug 60' to the last lug 60'' while the corresponding side margins 104 of the lugs 60 progressively decreases in axial dimension. Thus, the upper margin 102 of least radial dimension (on lug 60' in FIG. 4) has a radial length that is less than the radial lengths of the upper margins of any of the other lugs. In the preferred embodiment illustrated, the upper margin 102 of least radial dimension (on lug 60') has a radial length that is less than one-half of the radial length of the lug upper margin of greatest radial dimension (on lug 60''). A greater or lesser relative difference may be employed in alternate embodiments (not illustrated).

Similarly, in the preferred embodiment illustrated, the lug side margin 104 of least axial dimension (for the last lug 60''') has an axial depth that is less than one-half of the axial depth of the lug side margin of greatest axial dimension (on the first lug 60'). A greater or lesser relative difference may be employed in alternate embodiments (not illustrated).

With reference to FIG. 6, each lug 60 preferably has two exposed surfaces 121 and 122 which each extend from the shank 52 and from the head 54 at an angle to each other and which intersect to define an edge connecting the two exposed surfaces along the exposed engaging margin 70. Preferably, each exposed surface 121 and 122 is a planar surface that intersects (1) the head lower surface 90 along a straight line, (2) the other planar surface of the lug along a straight line at the engaging margin 70, and (3) the surface of the shank 52 along an arcuate line. The intersection of the surface 121 with the surface of the shank 52 appears in the two-dimensional perspective view of FIG. 6 to be a generally straight line. However, it is to be realized that, in the preferred embodiment, at least the upper portion of the shank 52 below the head 54 is cylindrical. Thus, the intersection of the planar surface 121 (and of the analogous planar surface 122) with the cylindrical surface of the shank 52 would result in a locus defining a curved line of intersection.

The novel structure of the lug 60 described above defines spaces between the lugs. The axial depth along the shank 52 of each space defined between two adjacent lugs 60 varies with the circumferential location of each space. Further, the radial length along the head lower surface 90 of the spaces defined two adjacent lugs also varies with the circumferential location of each space.

In the preferred embodiment, the lugs 60 decrease in axial dimension by an equal amount seriation from lug 60' to lug 60'' while the lugs 60 increase in radial dimension by an equal amount seriatim from lug 60' to lug 60''. This provides an even more constant contact between the bearing plate 12 and the lugs 60.

The above-described novel structure of the improved threaded fastener 50 of the present invention provides improved performance when properly installed to secure together two panels of sheet material 12 and 14. As in the case of the prior art fastener 10 illustrated in FIG. 1 and described above, the improved threaded fastener 50 is adapted to be installed in the panels 12 and 14 in apertures which have predetermined diameters. Specifically, the upper bearing panel 12 has an aperture 16 with a diameter greater than the major diameter of the fastener thread crest and the lower tapping panel 14 has an aperture 18 with a diameter less than the fastener thread major diameter but typically not less than the fastener thread minor diameter.

As the fastener 50 is driven into the panels 12 and 14, the lugs 60 contact the bearing plate 12. This contributes to higher resistance to strip-out, increased operating range, and greater differential between the strip-out torque and the drive torque.

The progressively increasing radial dimension of the lugs with the corresponding decrease in axial dimension of the lugs results in the pressing of the bearing panel 12 against the tapping panel 14 which is forced against the thread form 56. This increases structural integrity and provides further resistance to strip-out.

The fastener 50, in effect, clamps the bearing panel 12 and tapping panel 14 between the lugs 60 and the thread form 56. This provides improved performance, especially compared with conventional prior art fasteners, such as the fastener 10 illustrated in FIG. 1, wherein the fastener shank minor diameter is within one thread pitch of the fastener head bearing surface 28.

It will be readily observed from the foregoing detailed description of the invention and from the illustrated embodiment thereof that numerous variations and modifications may be effected without departing from the true spirit and scope of the novel concepts or principles of this invention.

What is claimed is:

1. A threaded fastener having a generally cylindrical shank; a head connected to said shank; and a thread form on said shank terminating in spaced relation below said head; said head having a lower surface extending peripherally around said shank; said fastener further including a plurality of lugs located above said thread form and circumferentially disposed around said shank seriatim from a first lug to a last lug with a space defined between each two adjacent lugs; each said lug having an upper margin connected to said head lower surface and having a side margin connected to said fastener shank above said thread form; each said lug having two exposed surfaces which each extend from said side margin along said shank and from said upper margin along said head lower surface at an angle to each other; said two exposed surfaces of each said lug intersecting to define an exposed engaging edge connecting said two exposed surfaces, said engaging edge of at least some of said lugs functioning to engage at least a top sheet when the fastener is installed to fasten the top sheet to a bottom sheet; each said surface of each said lug being a planar surface intersecting said lower surface of said head along a straight line, intersecting the other planar surface of said lug along a straight line at said exposed engaging edge, and intersecting the cylindrical surface of said shank along an arcuate line; said upper margins of said lugs progressively increasing in radial dimension from said first lug to said last lug while the corresponding side margins of said lugs progressively decrease in axial dimension whereby said acute angle becomes progressively greater.

2. The fastener in accordance with claim 1 in which said upper margins of said lugs increase in radial dimension seriatim around said shank from said first lug to said last lug in the circumferential direction identical to that in which said thread form extends toward said fastener head.

3. The fastener in accordance with claim 1 in which said fastener further includes an annular rim depending from the periphery of said head to define a recess below said head, said lower surface of said head defining the upper boundary of said recess.

4. A threaded fastener having a shank; a head connected to said shank; and a thread form on said shank terminating in spaced relation below said head, said head having a lower surface extending peripherally around said shank, said fastener further including a plurality of lugs located above said thread form and circumferentially disposed around said shank seriatim from a first lug to a last lug with a space defined between each two adjacent lugs, each said lug having an upper margin connected to said head lower surface and having a side margin connected to said fastener shank above said thread form, each said lug having an exposed engaging margin extending at an acute angle relative to the longitudinal axis of said fastener between said upper margin at the fastener head lower surface and said side margin at the fastener shank, said engaging margin of at least some of said lugs functioning to engage at least a top sheet when the fastener is installed to fasten the top sheet to a bottom sheet, said upper margins of said lugs progressively increasing in radial dimension from said first lug to said last lug while the corresponding side margins of said lugs progressively decrease in axial dimension whereby said acute angle becomes progressively greater.

5. The fastener in accordance with claim 4 in which said upper margins of said lugs increase in radial dimension seriatim around said shank from said first lug to said last lug in the circumferential direction identical to that in which said thread form extends toward said fastener head.

6. The fastener in accordance with claim 4 in which said head lower surface is substantially planar and defines an annulus around said shank; in which said fastener further includes an annular rim depending from the periphery of said head to define a recess below said head; and in which said lower surface of said head defines the upper boundary of said recess.

7. The fastener in accordance with claim 4
in which the axial depth along said shank of said spaces defined between two adjacent lugs varies with the circumferential location of each space; and
in which the radial length along said head lower surface of said spaces defined between two adjacent lugs varies with the circumferential location of each space.

8. The fastener in acordance with claim 4 in which said shank is substantially cylindrical over a major portion of its length and in which said thread form defines a single, helical, right-hand thread.

9. A threaded fastener having a shank; a head connected to said shank; and a thread form on said shank terminating below said head; said fastener further including a plurality of lugs located above at least a portion of said thread form and circumferentially disposed under said fastener head around said shank seriatim from a first lug to a last lug, each said lug defining an exposed engaging margin extending from said fastener shank at an acute angle relative to the longitudinal axis of said fastener, said engaging margin of at least some of said lugs functioning to engage at least a top sheet when the fastener is installed to fasten the top sheet to a bottom sheet; the maximum radial dimension of each lug progressively increasing from said first lug to said last lug while the corresponding maximum axial dimension of each lug progressively decreases whereby said acute angle becomes progressively greater.

10. The fastener in acordance with claim 9 in which said lugs are equally spaced around said shank.

11. The fastener in accordance with claim 9 in which
said fastener head has a lower surface extending peripherally around said shank;
each said lug has an upper margin connected to said head lower surface and has a side margin connected to said fastener shank above said thread form;
each said lug exposed engaging margin extends at an acute angle relative to the longitudinal axis of said fastener between said upper margin at the fastener head lower surface and said side margin at the fastener shank; and
said upper margins of said lugs progressively increase in radial dimension from said first lug to said last lug while the corresponding side margins of said lugs progressively decrease in axial dimension whereby said acute angle becomes progressively greater.

12. The fastener in accordance with claim 11 in which
said head lower surface is substantially planar and defines an annulus around said shank;
said fastener includes an annular rim depending from the periphery of said head to define a recess below said head lower surface; and
the axial dimension of the side margin of at least one of said lugs is less than the axial length of said rim below said head lower surface.

13. The fastener in acordance with claim 11 in which the lug upper margin of least radial dimension has a radial length that is less than one-half of the radial length of the lug upper margin of greatest radial dimension.

14. The fastener in accordance with claim 11 in which the lug side margin of least axial dimension has an axial depth that is less than one-half of the axial depth of the lug side margin of greatest axial dimension.

15. The fastener in accordance with claim 9 in which each said lug has two exposed surfaces which each extend from said shank and from said head at an angle to each other and which intersect to define an edge connecting said two exposed surfaces along said exposed engaging margin.

16. The fastener in accordance with claim 15 in which said fastener head has a flat lower surface extending peripherally around said shank and in which each said exposed surface of said lug is a planar surface that intersects (1) said head lower surface along a straight line, (2) the other planar surface of said lug along a straight line at said engaging margin, and (3) the surface of said shank along an arcuate line.

* * * * *

UNITED STATES PATENT AND TRADEMARK OFFICE
CERTIFICATE OF CORRECTION

PATENT NO. : 4,820,235
DATED : April 11, 1989
INVENTOR(S) : David Weber and Stanley Marchewka It is certified that error appears in the above-identified patent and that said Letters Patent is hereby corrected as shown below:

On the front sheet of the patent, in the left-hand column, in line 7, the Assignee listed as "Hirsh Company, Skokie, Ill." should be changed to --Pioneer Screw & Nut Company--;

Column 1, line 13, "employe" should be --employ--;

Column 1, line 33, "then" should be --than--;

Column 1, line 64, "thin of" should be --thin panels of--;

Column 2, line 56, "it to" should be --it is to--; and

Column 8, line 19, "acordance" should be --accordance--.

Signed and Sealed this

Ninth Day of January, 1990

*Attest:*

JEFFREY M. SAMUELS

*Attesting Officer*   *Acting Commissioner of Patents and Trademarks*